Sept. 6, 1932. G. EVORITT 1,875,373
VARIABLE PITCH PROPELLER
Filed Aug. 5, 1930  5 Sheets-Sheet 1

Inventor
Guy Evoritt
By *Clarence A. O'Brien*
Attorney

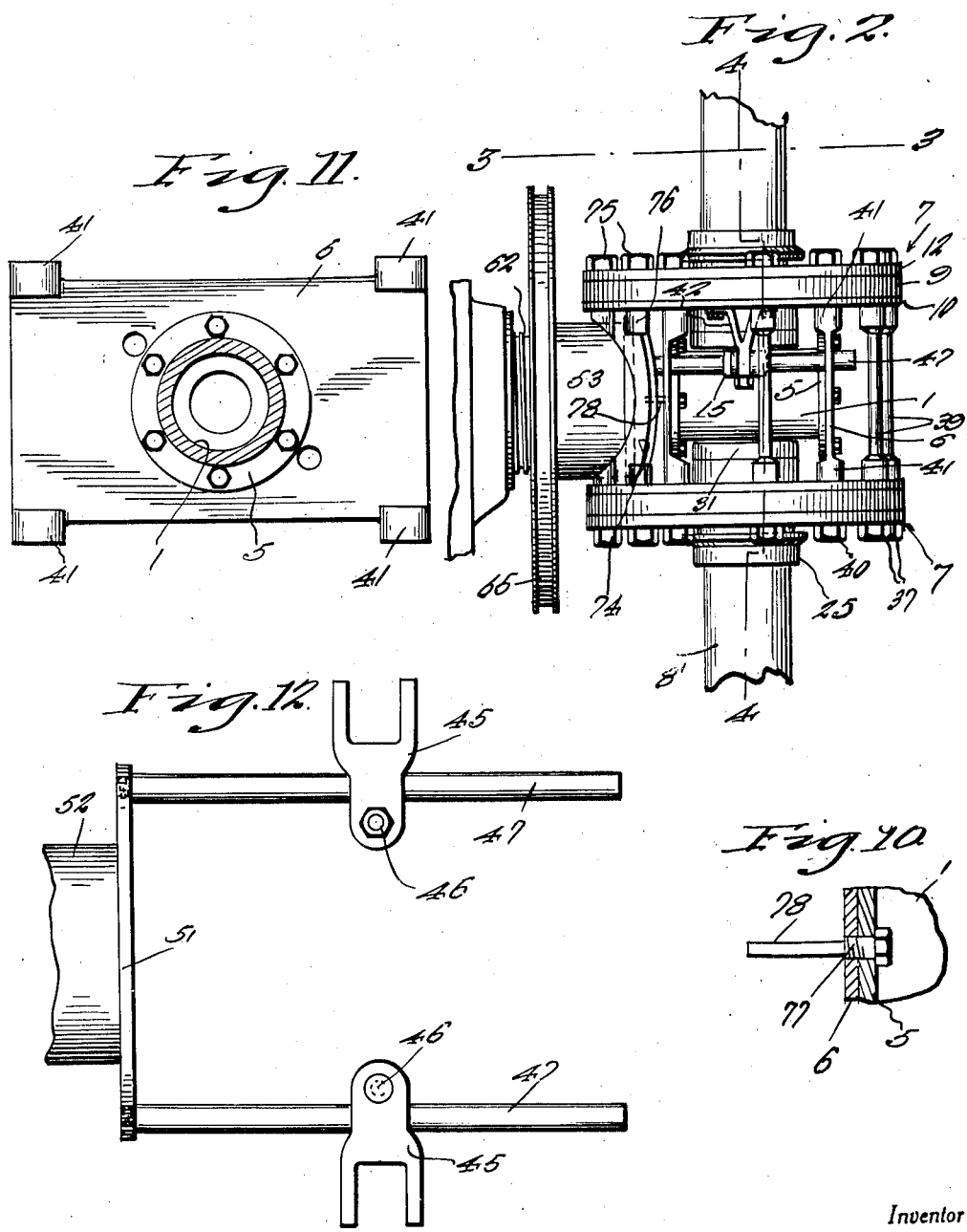

Sept. 6, 1932. G. EVORITT 1,875,373
VARIABLE PITCH PROPELLER
Filed Aug. 5, 1930 5 Sheets-Sheet 3
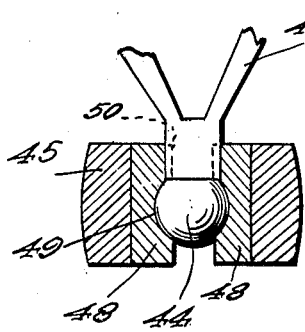
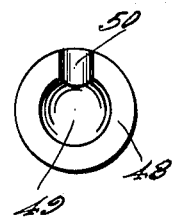
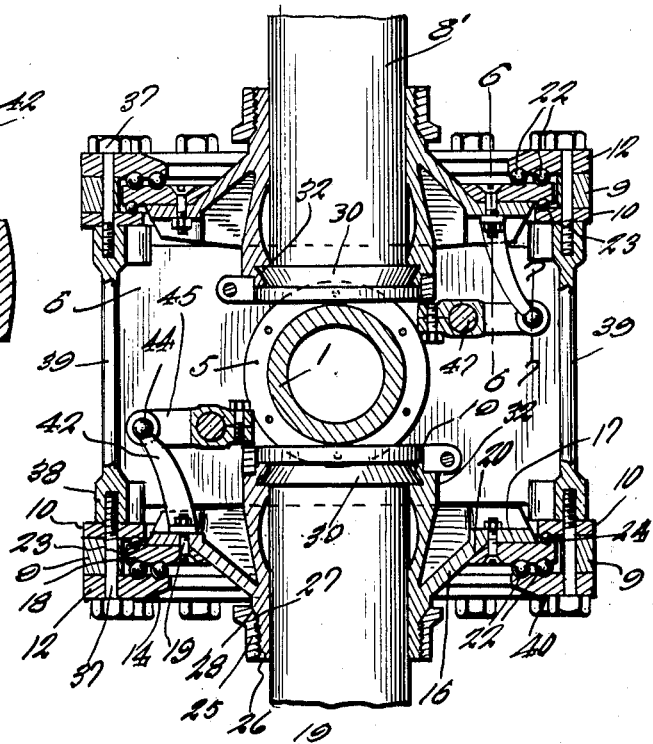
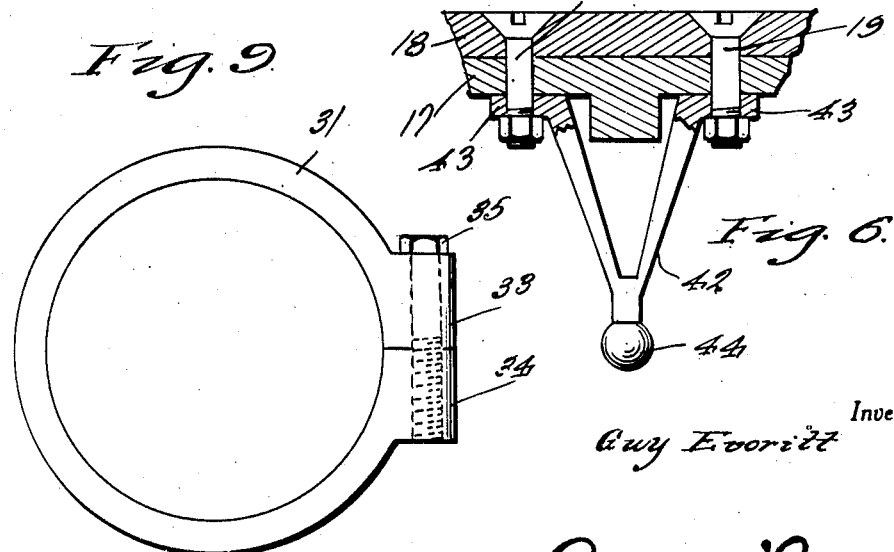
Inventor
Guy Evoritt
By Clarence A. O'Brien
Attorney Sept. 6, 1932.    G. EVORITT    1,875,373
VARIABLE PITCH PROPELLER
Filed Aug. 5, 1930    5 Sheets-Sheet 4
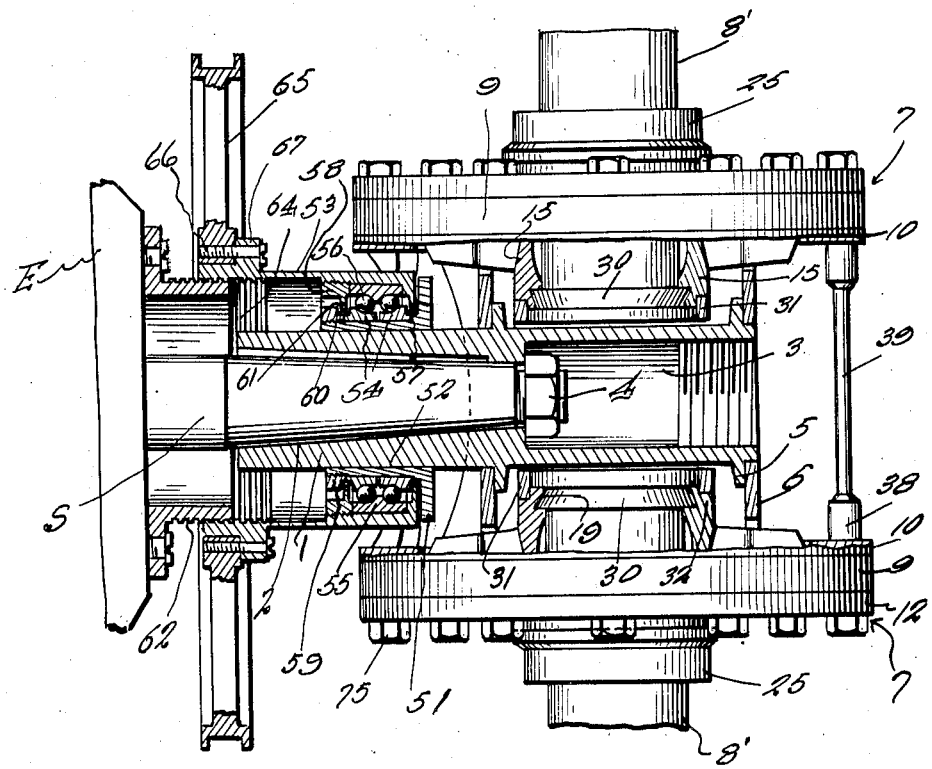
Fig. 5.
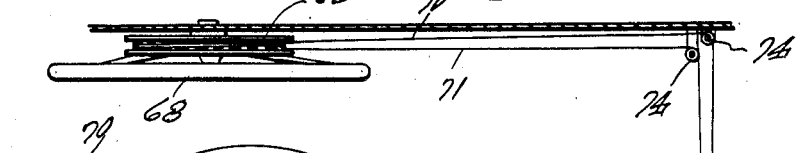
Fig. 13.
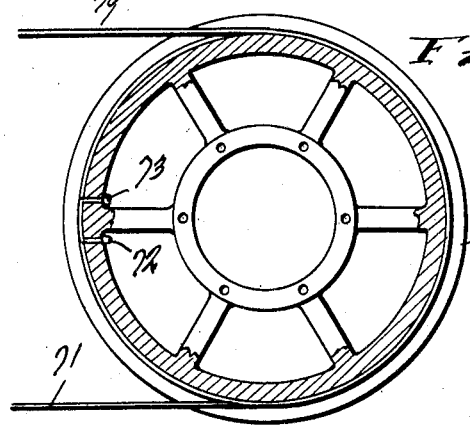
Fig. 14.
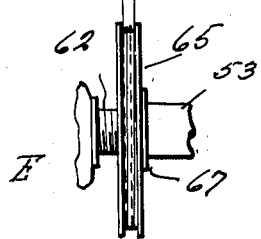
Inventor
Guy Evoritt
By Clarence A. O'Brien
Attorney

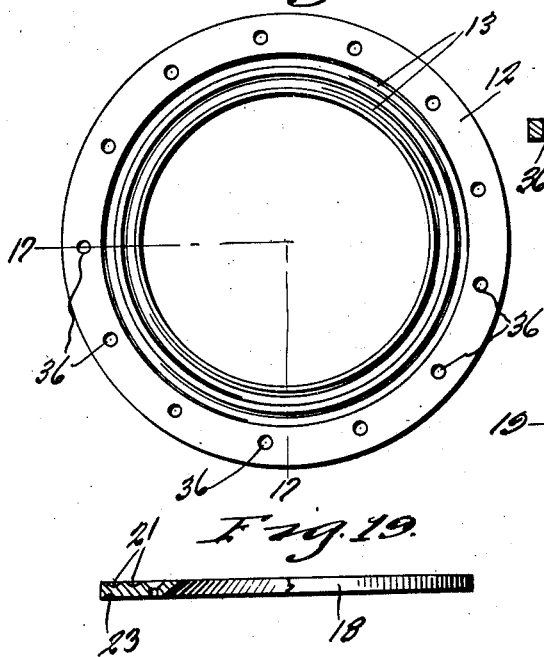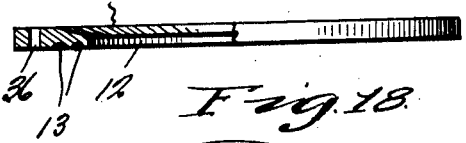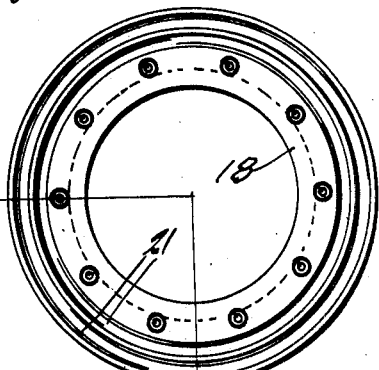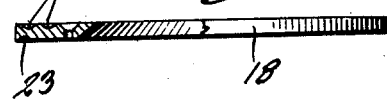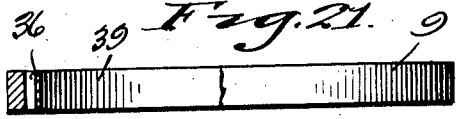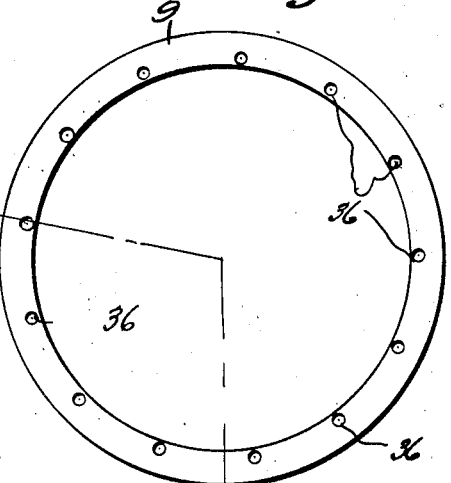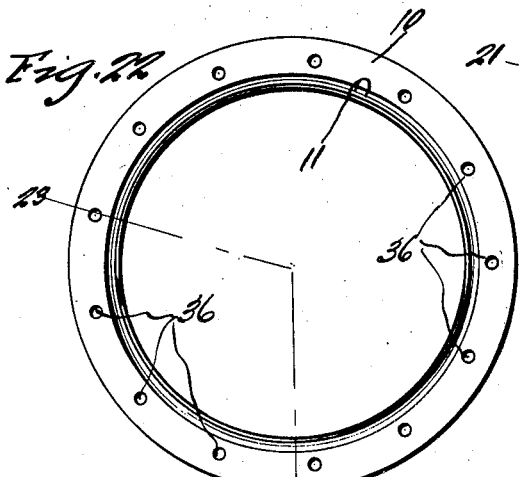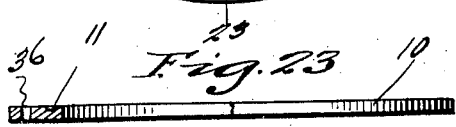

Patented Sept. 6, 1932

1,875,373

UNITED STATES PATENT OFFICE

GUY EVORITT, OF PRINCETON, MISSOURI

VARIABLE PITCH PROPELLER

Application filed August 5, 1930. Serial No. 473,247.

This invention relates to aeroplane propellers, and has more particular reference to a variable pitch propeller.

A primary object of this invention is to provide a variable pitch propeller embodying certain new improvements over such types of variable pitch propeller as forms the subject matter of my copending application filed under date of July 10, 1929 Serial No. 377,162.

A primary object of the present invention is to provide a variable pitch propeller which will permit ready varying of the pitch of the propeller blades, secondly to provide an improved combined bearing and supporting means for rotatably supporting the propeller blade on the hub of the propeller; thirdly, to minimize the possibility of such "play" between certain connected parts of the device, as has heretofore been the disadvantage of variable pitch propeller construction, in that the "play" alluded to, detracts from the efficiency of the propeller insofar that the same prevents the varying of the pitch of the propeller blades to such a "nicety" as is essential, that is to say, that due to such a "play" the blades are not at all times rotated a uniform fraction of a revolution, since one of the blades is liable to be rotated a greater portion of a revolution than the other blade is rotated, as is apparent.

A still further object of the invention is to provide an improved means for rotating the propeller blades for varying the pitch of the propeller.

Figure 1:
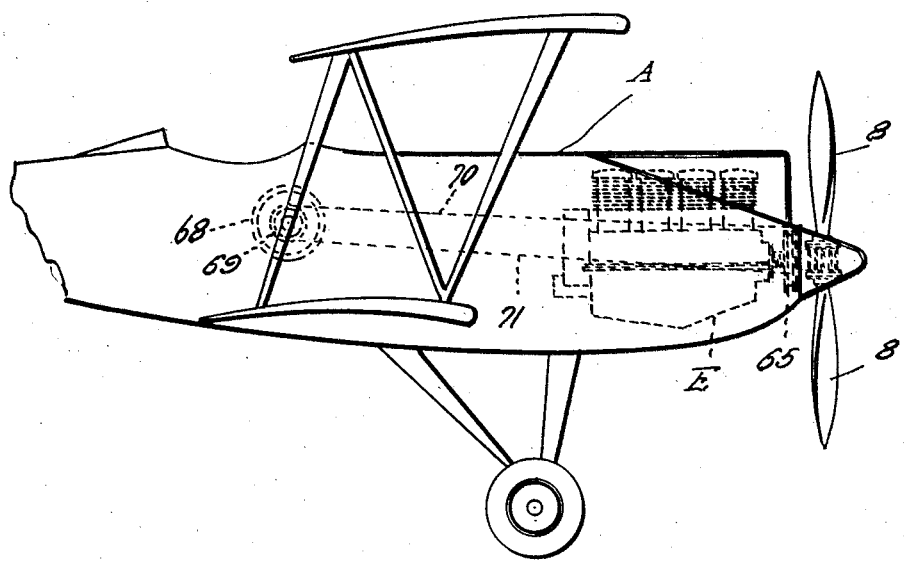
Figure 15:
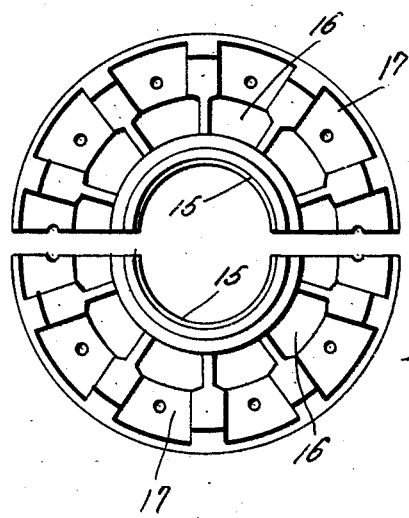
Figure 3:
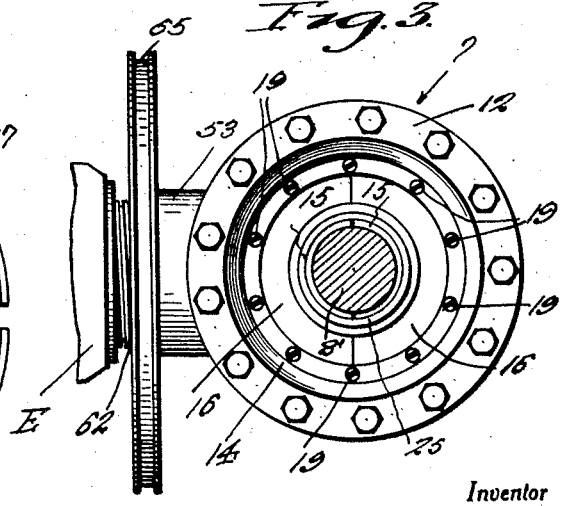

Other objects and advantages of the invention will become apparent during a study of the following description, taken in connection with the accompanying drawings wherein:

Figure 1 is a side elevational view of the forward portion of an aeroplane the same illustrated as having my invention applied thereto, Figure 2 is a fragmentary top plan view of the invention, Figure 3 is a detail sectional view taken substantially on the line 3—3 of Figure 2, Figure 4 is a transverse sectional view taken substantially on the line 4—4 of Figure 2, Figure 5 is a fragmentary detail view partly in section and partly in elevation, Figure 6 is a detail sectional view taken substantially on line 6—6 of Figure 4, Figure 7 is a detail sectional view taken substantially on line 7—7 of Figure 4, Figure 8 is a plan view of one of the pocket-forming members to be hereinafter more fully referred to, Figure 9 is a plan view of the clamping ring, Figure 10 is a fragmentary detail view partly in section and partly in elevation illustrating certain details of construction hereinafter more fully referred to, Figure 11 is a plan view of a spacer plate, Figure 12 is a plan view showing a portion of the shiftable member and the operating bars carried thereby, Figure 13 is somewhat of a diagrammatic view illustrating the control mechanism, Figure 14 is a sectional view taken through one of the pulleys for more clearly illustrating the manner of training cables thereover, Figure 15 is an end elevational view of the sectional clamp forming part of the invention, Figure 16 is a bottom plan view of the outer double ball weight member, Figure 17 is a detail sectional view taken substantially on the line 17—17 of Figure 16, Figure 18 is a top plan view of an intermediate bearing member, Figure 19 is a detail sectional view therethrough taken substantially on the line 19—19 of Figure 18, Figure 20 is an elevational view of an annular member forming part of the bearing construction, Figure 21 is a detail sectional view taken substantially on the line 21—21 of Figure 20, Figure 22 is a top plan view of the inner single bearing member, Figure 23 is a detail sectional view therethrough taken substantially on the line 23—23 of Figure 2.

With reference more in detail to the drawings, it will be seen that I have, for the sake of illustration shown my invention as applied to a conventional type of aeroplane A equipped with a suitable prime mover E which includes among other parts the usual crank shaft, the outer forward end of which is designated by the reference character S.

My improved variable pitch propeller includes the hub 1 having a conical bore 2 for accommodating the tapered end of the shaft S, the hub being suitably keyed to the shaft S for rotation therewith. Adjacent its outer free end the hub 1 is provided with a suitable counter bore 3 for facilitating the threading of the nut 4 on the threaded end of the shaft S for retaining the hub 1 against longitudinal movement relative to the shaft.

Adjacent said outer or free end, the hub 1 is provided with a pair of longitudinally spaced annular outstanding flanges 5 to which are bolted suitable spacer plates 6.

Arranged on diametrically opposite sides of the hub 1, and supported on the outer ends of the spacer plates 6, are combined bearing assemblies and propeller blade supports 7 for rotatably supporting the propeller blades 8.

Each of the propeller blade supports and bearings 7, as shown to advantage in Figure 4 comprise an annulus or casing forming member 9 to the inner side of which is disposed a bearing ring 10 provided on its inner end adjacent its inner edge with an annular ball race 11. Disposed adjacent the outer end of the annulus 9 is an outer bearing ring 12, provided on its inner face with a pair of concentric bearing races 13. Preferably, the outer bearing ring 12 on its outer face and adjacent its inner edge is beveled as at 14.

A propeller blade clamp is adapted to be mounted concentrically of the annulus 9, said clamp being further adapted for rotative movement for varying the pitch of the propeller blades carried thereby as will be hereinafter more manifest.

In Figure 15 I have shown the above referred to clamp as preferably comprising a pair of cylindrical similar sections 15 adapted to be clamped about the shank 8' of the propeller blade 8. Each of the clamp sections 15 has an integral web 16 that extends inwardly from the inner end thereof and substantially obliquely to the axis of the clamp. The web 16 at its outer end merges into an outstanding apertured flange 17. The flanges 17 cooperate to support concentrically of the clamp an intermediate bearing ring 18. The intermediate bearing ring 18 is suitably apertured and is secured to the flanges 17 through the medium of suitable fastening elements 19, the latter being preferably in the form of bolts, having their heads countersunk in the flanges 17. The bearing ring 18 has its inner edge beveled for engaging the outer faces of the webs 16. (See Figure 4). A pair of inner and outer concentric bearing races 21 are provided on one face of the bearing ring 18 and cooperate with the inner and outer concentric bearing races 13 of the bearing rings 12 for supporting suitable anti-friction means, preferably in the nature of relatively large ball bearings 22. On its opposite faces, adjacent its peripheral edge said bearing ring 18 is provided with a single bearing race 23 cooperating with the bearing race 11 of the inner bearing ring 10 for supporting anti-friction means, preferably in the nature of relatively small ball bearings 24.

For securing the sections of the clamp about the shank 8' of the propeller blades, there is provided a retaining nut 25 for threadedly engaging the externally threaded outer end portion of the clamp section as at 26. The sections 15 inwardly from said threaded end portion is provided with an outstanding beveled shoulder 27 with which, the internal beveled seat 28 of the nut 25 contacts when the nut is securely threaded in clamping position.

Adjacent the inner end of the clamp the sections 15 thereof are each provided with an internal undercut groove 29 for conformably receiving a beveled annular shoulder 30 formed on the blade shank 8' adjacent the inner end of the blade shank. (See Figure 4).

For clamping the inner end of the section 15 about the propeller blades 8' there is provided a split ring like clamp member 31 that is disposed about the inner end of the clamp, and has its inner end contacting an external shoulder 32 formed on said blade clamp inwardly from the inner ends of the section 15. The split ring clamp 31 at its free end is provided with opposed apertured lugs 33 and 34 respectively, the bore of the lug 33 being smooth, and the bore of the lug 34 being threaded. A retaining bolt 35 has the smooth portion of its shank arranged in the bore of the lug 33, and the threaded end portion of its shank threaded in the bore of the lug 34 for drawing the ends of the split ring clamp 31 inwardly toward one another, thus securing the split ring clamp 31 in position about the blade clamp.

As before intimated, the annular member 9, and the bearing rings 10 and 12, are each provided with an annular series of spaced openings 36 for accommodating bolts 37. Each of the bolts 37 has its free end provided for threaded engagement in an internally threaded socket 38 on one end of a spacer rod 39. The spacer rods 39 extend in an annular series and transversely with respect to the propeller hub 1. Other of the apertures 36 accommodate the bolts 40 that have their free inner ends threaded in lugs 41 formed on the spacer plates 6. Each plate 6 is provided with approximately four of such lugs 41 there being one adjacent each corner of the plate.

Having thus described the combined propeller blade supports and bearing structure, together with means for supporting the same one to each side of the hub, diametrically opposite with respect to one another, I will now proceed to describe the means for varying the pitch of the propeller blades. In this connection, it will be seen that each combined propeller blade support and bearing structure include an arm 42, the same being in the nature of a fork including a pair of diverging leg portions terminating at one end in oppositely extending apertured lugs 43 for engaging one end of one of the bolts 19. At their converging ends, the legs of the arms merge into a shank terminating in a ball 44.

For each ball 44 there is provided a substantially U-shaped member 45 that includes a bifurcated shank portion clamped as at 46 about an operating rod 47. Arranged between the legs of the member 45 is a pair of similar socket forming members 48, each of which on its inner face is provided with a concaved seat 49 for receiving a portion of the ball 44. For accommodating the shank of the arm 42, each of the socket forming members 48 is provided with a radial semi-cylindrical portion 50. Thus it will be seen, that the ball 44 will fit conformably in the concaved seat 49 of the socket forming members 48, and the socket members 48 being clamped between the ball 44 and the legs of the fork member 45. The possibility of any play in such structure that affords operating connection between the operating arm 47, and the arm 42 is almost negligible. The arm 42 preferably is longitudinally curved as suggested in Figure 4.

The operating rods 47 extend one above and one below the hub 1 parallel to the hub. At their inner ends, the operating rods 47 are suitably secured to an outstanding flange 51 provided on the forward end of a sleeve 52 that is slidably or shiftably arranged on the hub 1 adjacent the rear end of the hub. Arranged concentrically of the sleeve 52 is a relatively large shifting sleeve 53. Arranged between the sleeve 52 and the shifting sleeve 53 is a bearing assembly comprising a pair of inner ball races 54 and an outer ball race 55 cooperating with the inner ball races 54 for suitably supporting two annular series of ball bearings 56.

In order that the shifting sleeve 53, the sleeve 52, and the bearing assembly just referred to may be shifted axially of the hub, as a unit, there is provided on the forward end of the shifting sleeve 53 an inwardly directed flange 57 that extends between the flange 51 and the inner end of said bearing assembly. An outer retaining nut 58 is threaded within the sleeve 53. An inner nut 59 is threadedly engaged with the inner end of the sleeve 52 concentrically of the nut 58. The inner nut 59 is provided with an annular groove 60 on its outer periphery for accommodating an internal annular tongue or flange 61 provided on the nut 58 whereby is provided a tongue and groove connection between the nuts 58 and 59.

From the foregoing detailed description, it will be seen that as the sleeve 53 is shifted longitudinally of the hub, the bearing assembly, together with sleeve 52 will be shifted in a corresponding direction, resulting in a shifting of the operating rods 47 to rock the arms 42, whereby rotative movement is transmitted to the propeller blades 8 for varying the pitch of the propeller.

Obviously various means may be used for shifting the sleeve 53. However I prefer to use such shifting means as includes an externally threaded annulus 62 arranged concentrically of the shaft S and at its inner end suitably anchored to the forward end of the casing of the prime mover by any suitable means such as is indicated at 63. The shifting sleeve 53 at its inner end is provided with internal threads 64 for threadedly engaging the annulus 62. On said inner end thereof, the sleeve 53 has mounted a grooved pulley 65 that is secured to said sleeve 63 through the medium of suitable fastening means such as bolts 66 that engage the pulley wheel 65 and an outstanding annular flange 67 formed on said sleeve inwardly from said end of the sleeve.

Suitably mounted in the cockpit of the aeroplane within convenient reach of the pilot is a control wheel 68 that has integral therewith a grooved pulley wheel 69. A pair of cables 70 and 71 respectively have their corresponding ends oppositely trained over the respective grooved pulleys 65 and 69, the cables at their said ends being secured to the said pulley wheels in any manner such as suggested at 72 and 73 respectively. The manner of training the cable over the pulley wheels, together with the manner of anchoring the ends of the cable to the respective pulley wheels is best shown in Figure 14. As shown in Figure 13, the intermediate portion of the cable may be trained over suitable guide pulleys 74.

Thus to effect a variation in the pitch of the propeller blades, it will be seen that the wheel 68 may be rotated in the desired direction, thereby transmitting rotation to the pulleys 65 and 69 for threading the sleeve 53 axially of the annular member. Longitudinal movement of the sleeve 53 thus effected will as before stated, and through the medium of the means hereinbefore specified effect a simultaneous rotation of the propeller blades 8 in a direction opposite to one another for varying the pitch of the propeller.

If desired, there may be also provided a longitudinally curved spacer plate 74 disposed between the combined propeller blade support and bearing structures 7 and having an opening for accommodating the shifting sleeve 53 and associated parts. The guide plate 74 at opposite side edges thereof is provided with integral threading lugs; and suitable bolts 75 extend through certain of the apertures 36 and have their inner ends ends threadedly engaging the lugs 76 of the guide plate 74.

It is also to be understood, that the spacer plates 6 are provided with suitable apertures for slidably accommodating the operating rods 47. To limit shifting movement of sleeve 53 and its associated parts, in one direction, there is provided a stop that includes a bolt portion 77 threadedly engaged with the rearwardmost flange 5 and plate 6 bolted to the flange. The shank of the stop nut 37 is provided with a reduced elongated portion 78 against the free end of which the flange 51 of sleeve 52 is adapted to abut when sleeve 53 and its associated parts including sleeve 52 is rotated for movement in a forward direction, or to the right in Figure 2.

Even though I have herein shown and described the preferred embodiment of my invention, it is to be understood that the same is susceptible to changes fully comprehended by the spirit of the invention as herein described and the scope of the appended claims.

Having thus described my invention, what I claim as new is:

1. A variable pitch propeller comprising in combination a pair of opposed combined propeller blade supports and bearing structures, each of said combined supports and bearing structures including a pair of opposed bearing rings, an annular member disposed between the opposed bearing rings, spacer bars extending between said combined supports and bearing structures, and bolts passing through the rings, said annular members, and engageable with said spacer bars for retaining said parts in assembled relation.

2. A variable pitch propeller comprising in combination, a pair of opposed combined propeller blade supports and bearing structures, each of said combined supports and bearing structures including a pair of opposed bearing rings, an annular member disposed between the opposed bearing rings, spacer bars extending between said combined supports and bearing structures, and bolts passing through the rings, said annular members engageable with said spacer bars for retaining said parts in assembled relation, and each of said bearing structures including rotatable means for supporting a propeller blade concentrically of the combined support and bearing structure.

3. A variable pitch propeller including in combination a pair of oppositely disposed combined propeller blade supports and bearing structures each of which includes a pair of spaced opposed bearing rings, an annular member positioned between said rings, spacer bars extending between said combined support and bearing structures and means engageable with said bars and with the rings and annular member of the respective support and bearing structures for securing the referred to parts in assembled relation, a propeller blade shank engaging member arranged concentrically of each of said annular members, means for rotatably supporting said blade shank engaging members, and means for rotating said blade shank engaging members.

4. In a variable pitch propeller, mechanism for changing the pitch of the propeller blades comprising a screw threaded stationary annulus, a sleeve threaded thereon to revolve and move longitudinally on rotation, a second sleeve slidably mounted and parallel with the revoluble sleeve, an anti-friction bearing interposed between the sleeves, and means carried by the sleeves and engaging the bearing at relatively opposite sides thereof to communicate longitudinal movement to the second sleeve on rotation of the first named sleeve.

5. In a variable pitch propeller, mechanism for varying the pitch in the propeller blade comprising a screw threaded stationary member, a sleeve threaded thereon to revolve and move longitudinally on rotation, a second sleeve slidably mounted and arranged within the first named sleeve, an anti-friction bearing interposed between the sleeves, a flange on one of said sleeves engaging the bearing at one side of the latter, and inter-engaging means internally of the first named sleeve and externally of the second named sleeve and engaging the anti-friction bearing on the side of the latter removed from said flange to communicate longitudinal movement to the second named sleeve on rotation of the first named sleeve.

6. In a variable pitch propeller, a hub, a propeller blade embracing clamps rotatably mounted on the hub, bearing means on the hub for rotatably supporting said clamps, a sleeve slidably mounted on the hub, motion transmitting means connecting said sleeve with said clamp, a screw threaded member fixed relative to the hub, a second sleeve threaded or said screw threaded member to revolve and move longitudinally on rotation, and inter-engaging means on the the first and second named sleeves to transmit longitudinal movement to the sleeve on the hub on rotation of the second named sleeve to thereby rotate said clamp.

In testimony whereof I affix my signature.

GUY EVORITT.